April 16, 1968

J. E. HODGSON

3,377,955

COATED TABLETS AND OTHER FUEL CORES OF EXOTIC REACTIVE
FUELS AND METHOD OF MAKING SAME

Filed June 7, 1961

INVENTOR.
JAMES E. HODGSON

BY
Meyer, Baldwin, Doran & Young
ATTORNEYS

April 16, 1968

J. E. HODGSON

3,377,955

COATED TABLETS AND OTHER FUEL CORES OF EXOTIC REACTIVE
FUELS AND METHOD OF MAKING SAME

Filed June 7, 1961

INVENTOR.
JAMES E. HODGSON
BY
Meyer, Baldwin, Doran & Young
ATTORNEYS

April 16, 1968  J. E. HODGSON  3,377,955
COATED TABLETS AND OTHER FUEL CORES OF EXOTIC REACTIVE
FUELS AND METHOD OF MAKING SAME
Filed June 7, 1961  3 Sheets-Sheet 3

INVENTOR.
JAMES E. HODGSON
BY
Meyer, Baldwin, Doran & Young
ATTORNEYS

United States Patent Office 3,377,955
Patented Apr. 16, 1968

3,377,955
COATED TABLETS AND OTHER FUEL CORES OF EXOTIC REACTIVE FUELS AND METHOD OF MAKING SAME
James E. Hodgson, Newport Beach, Calif., assignor to The Solid Fuels Corporation, Cleveland, Ohio, a corporation of Ohio
Continuation-in-part of applications Ser. No. 850,387, Nov. 2, 1959, and Ser. No. 862,692, Dec. 29, 1959. This application June 7, 1961, Ser. No. 115,504
15 Claims. (Cl. 102—102)

The present application is a continuation-in-part of application Ser. No. 850,387 filed Nov. 2, 1959, now Patent No. 3,159,104 and Ser. No. 862,692 filed Dec. 29, 1959, now Patent No. 3,158,994.

The present invention is directed to coated exotic fuel cores such as tablets of pressed metal-containing fuel particles and to a method of making the same.

It has not been possible to utilize otherwise desirable high energy delivering light metal hydride particles in large solid fuel rocket propellant compositions since the metal hydrides have always been used in a finely divided form for good dispersion in the composition and, in that form, were also highly reactive and unstable in storage, particularly when mixed with unstable oxidizer radicals. As is well known in the art, the exotic metal hydride particles will react prematurely with moisture and oxidizer particles and burn to detonation. Also, the known propellant binders cannot incorporate enough oxidizer and light metal hydride particles for a substantial improvement in the amount of energy delivered without suffering serious drawbacks in their physical properties such as lack of binding power including uneven burning or even detonation caused by the development of cracks in the composition.

In the present invention, even ordinary highly dangerous fuel particles such as lithium hydride or explosives such as R.D.X. or liquids such as tetranitromethane can be safely incorporated and stored in very large solid rocket propellant compositions by pressing exotic reactive metal-containing fuel particles such as lithium hydride together to form a pharmaceutical-size tablet and then coating the tablet with a material less reactive with oxidizing materials than the fuel particles such as powdered aluminum or an organic resin such as an epoxy resin. The pressing and coating of reactive fuel particles to a volume of about 1/1190 to about 8 cubic inches, as hereinafter described in detail, allows the fuel particles to be added safely to large propellant compositions, even those containing substantial amounts of oxidizers.

Therefore, it is an object of the present invention to provide a coated tablet of about pharmaceutical tablet-size of exotic metal-containing fuel particles such as lithium hydride so that the lithium hydride can be safely incorporated in large rocket propellant compositions for improved burning performance.

It is an object of the present invention to provide a method of making a coated tablet of about pharmaceutical tablet-size of exotic metal-containing fuel particles such as lithium hydride or a tablet of reactive liquid such as hydrazine so that the exotic metal hydride fuel particles or reactive liquids can be safely incorporated even in large rocket compositions to provide improved burning performance.

It is an object of the present invention to provide a pharmaceutical size tablet comprising a core of metal-containing fuel particles and an outer continuous film jacket for said core less reactive with oxidizing materials than said fuel particles to allow said fuel particles to be incorporated in a large solid propellant rocket composition without deterioration and reaction thereof.

It is an object to provide a solid propellant charge for a rocket engine which is capable of delivering high amounts of energy for thrust and which comprises oxidizer particles and a plurality of small coated fuel slugs such as tablets, discs and rods in a combustible binder for the slugs and the oxidizer particles.

It is an object of the present invention to provide a method of coating pharmaceutical size tablets comprising the steps of mixing a plurality of metal-containing fuel particles, mixing said particles together to form a tablet, and coating said tablet with a continuous film that is less reactive than said particles with oxidizing materials to prevent said fuel particles from detonating when mixed into a rocket composition and stored near oxidizing materials.

It is an object of the present invention to provide a method of treating exotic metal-containing fuel particles for safe incorporation in large rocket compositions comprising the steps of mixing a plurality of metal-containing fuel particles, pressing said particles together to form a tablet, and coating said tablet with an organic resin or an aluminum coating.

Other objects will be apparent from the specification that follows, the appended claims and the drawings in which:

Figure 1:
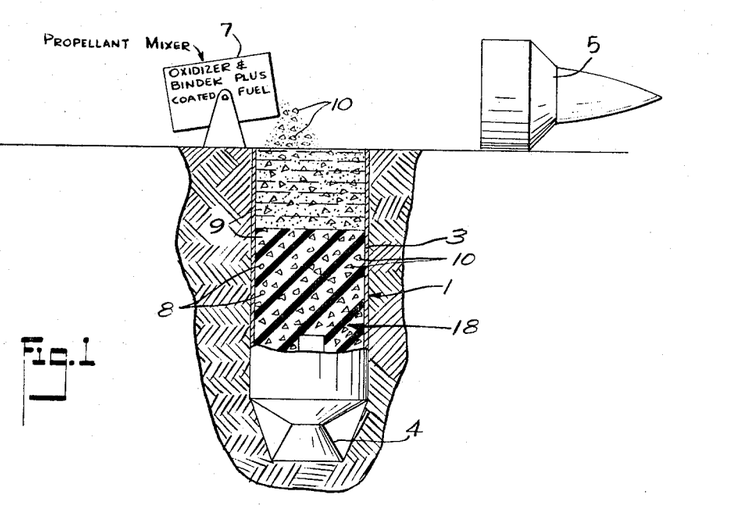
FIG. 1 is a diagrammatic view of a large solid-propellant rocket being loaded with fuel made in accordance with the present invention with parts being broken away and shown in section.
Figure 2:
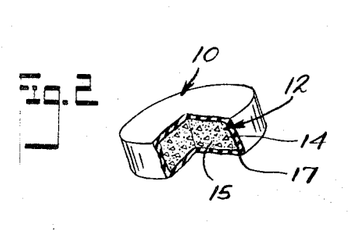
FIG. 2 is a perspective view of a coated pharmaceutical-size tablet of exotic metal-containing fuel particles with a portion thereof shown in section.
Figure 3:
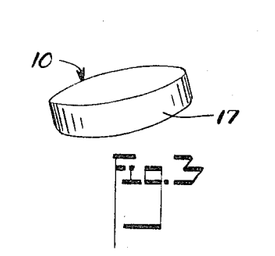
FIG. 3 is a perspective view of a coated fuel tablet such as shown in FIG. 2.
Figure 4:
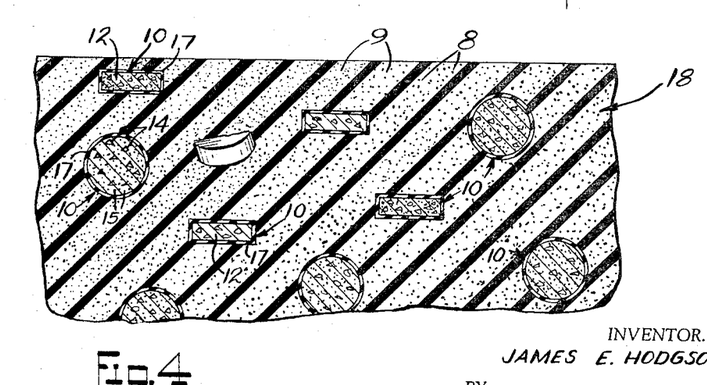
FIG. 4 is an enlarged sectional view of a solid propellant illustrating the use of coated fuel tablets in a conventional oxidizer-binder propellant composition according to the present invention.

The present invention provides, as best seen in a preferred embodiment shown in FIGS. 1, 2 and 3, a pharmaceutical-size tablet comprising a core of exotic metal-containing fuel particles and an outer continuous film jacketing said core, the film being combustible but less reactive with oxidizing materials to allow the exotic fuel particles to be incorporated in large rocket propellants without danger of premature reaction with oxidizing materials.

The present invention also provides a method of making the above described coated pharmaceutical-size tablets and other coated, relatively small volume slugs of exotic fuel materials by applying a coating of aluminum powder or plastic material to a core of exotic-metal and/or metal hydride particles to thereby add high energy delivering materials safely to the propellant composition.

In accordance with the present invention, exotic metal and metal hydride particles can be pressed together in pharmaceutical tableting machines in an inert atmosphere such as argon, hydrogen and nitrogen to form a tablet preferably about $3/16$ to $1/2$ inch thick and $3/16$ to $1/2$ inch in diameter, the resultant tablet coated with a thin film of an organic resin such as an epoxy resin of a thickness, say about $1/2$ to 10 mils, and the coated tablet safely and easily added to conventional solid rocket propellant generally comprising a plurality of oxidizer particles and a rubbery binder therefor.

Many of the exotic metals and their hydrides and carbides are useful as the metal-containing fuel particles of the present invention which form the fuel core generally having a volume of about $1/1190$ to about 8 cubic inches and preferably about $1/512$ to $1/8$ cubic inch.

It has been found that coating of individual particles of lithium hydride and other exotic fuel particles having a particle size, say of 10 microns up to 100 microns or slightly more do not provide a satisfactory method of adding high-energy materials to conventional solid rocket propellant charges. Generally the resultant mixtures are unstable and are subject to detonation.

In accordance with the present invention, it has been found that the compacted or pressed fuel core must have a volume at least as great as a sphere having a diameter of $1/16$ inch or a volume of about $1/1190$ cubic inch. On the other hand, much better results are obtained by using slightly larger cores of a volume at least as great as a cube having a volume of $1/512$ cubic inch with sides $1/16$ inch in length. Thus, while preferred volumes of the cores, whether they be spheres, rods, discs or cubes, is about $1/512$ cubic inch to $1/8$ square inch, cores having a volume of up to about 8 cubic inches (or cubes having sides of 2 inches in length) are useful in the largest rockets.

The coated fuel tablets, discs, wafers, rods and tubes may generally be added to the weight of the conventional propellant comprising usually 50 to 90 parts by weight of oxidizer particles of 10 to 400 mesh and 10 to 50 parts by weight of a rubbery binder such as a copolymer of styrene and butadiene and a polysulphide rubber in amounts of about 2 up to as high as 45 or 50 parts by weight per 100 parts of the oxidizer/binder. While amounts of 2 to 3 parts provide increased thrust safely, 15 to 35 parts are greatly preferred for increased burning performance without overtaxing the capacity of the binder to incorporate both the oxidizer particles and the coated fuel tablets. Likewise, in most cases 25 to 30 parts by weight provide the best results for the medium to large rockets—those having a diameter over 2 feet and a length over 15 feet to a diameter of 5 feet and a length of 60 feet or more.

A preferred composition for a large rocket would be as follows:

TABLE I

| Ingredients: | Parts by wt. |
|---|---|
| Oxidizer particles (such as ammonium perchlorate, lithium perchlorate) | 60–80 |
| Rubbery binder (such as a copolymer of 50–85 parts butadiene and 15 to 50 parts by weight of styrene) | 20–40 |
| Coated exotic fuel tablets or rods, discs, etc. | 15–35 |

Referring to the drawings, FIG. 1 shows a large rocket 1 comprising a main propellant-housing casing 3, an exhaust nozzle 4 and a forward section 5 being loaded with a propellant charge, the charge being poured into the casing 3 and solidified therein. As seen in FIG. 1, the starting materials for the propellant are a mixture 7 of oxidizer particles 8 and a rubbery combustible resin binder 9 therefore.

In accordance with the present invention, an improved propellant is produced by pouring in the oxidizer-binder mixture 7 a plurality of coated tablets 10 each of which, as illustrated in FIGS. 1–4 and seen in detail in FIG. 2, comprises a fuel core 12 containing a plurality of high energy-delivering lithium hydride particles 14 dispersed within a lithium binder 15. A tough, yet flexible coating 17 is provided around each fuel core 12 to jacket the same and allow its content of exotic fuel particles to be added safely and conveniently to the oxidizer 8 and binder 9 to thereby form an improved large solid rocket composition 18.

Figure 5:
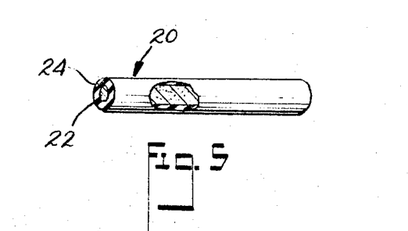
FIG. 5 is a perspective view, partly in section, of one form of a coated fuel slug in which exotic metal-containing fuel particles are encased in a thin-walled hollow plastic tube.

The exotic fuel particles, of which lithium hydride and lithium aluminum hydride are preferred, may be added to conventional oxidizer-binder propellant compositions in forms other than the coated tablet 10. For instance, FIGS. 5, 6, 7 and 8 illustrate other suitable shapes for the coated fuel slug forms. FIG. 5 shows a rod 20 comprising an inner fuel core 22 which contains compacted exotic fuel particles such as lithium hydride powder and an outer thin-walled polyethylene tube 24 to encase and jacket the fuel particles for easy and safe dispersion throughout conventional oxidizer-binder propellants.

Figure 6:
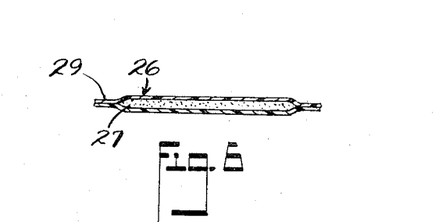
FIG. 6 is an elevational sectional view showing exotic fuel particles encased between two thin organic resin sheets.

FIG. 6 illustrates a section of a coated exotic metal pellet 26 comprising fuel core 27 of disc or rectangular-form which may consist of powdered lithium aluminum hydride and a plastic film 29 which may be an epoxy resin jacketing the fuel core to inhibit the reactive hydride core and prevent its premature reaction with moisture and oxidizer materials.

Figure 7:
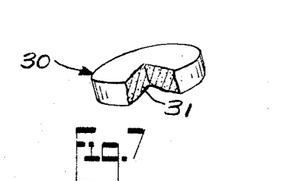
FIG. 7 is a perspective view of an uncoated fuel tablet of compacted exotic fuel particles with a portion broken away and shown in section.

FIG. 7 illustrates a pharmaceutical-size tablet 30 comprising an uncoated core of highly compacted lithium hydride particles 31, the particles being pressed together in a pharmaceutical tablet machine in an atmosphere of argon at a pressure of 1000 p.s.i. The tablet 30 is preferably coated with an aluminum or plastic film but in some applications, can be used as is for addition to conventional oxidizer-binder propellants, particularly when used in small amounts, say only 2 to 10 parts by weight per 100 parts by weight of oxidizer and binder.

Figure 8:
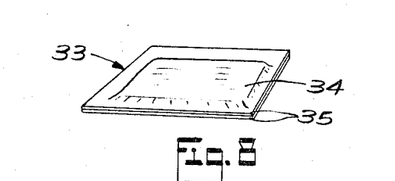
FIG. 8 is a perspective view of a coated fuel slug in the form of a thin wafer.

FIG. 8 illustrates a coated fuel wafer 33 comprising an inner exotic metal and metal hydride fuel core 34 encased between two thin polyethylene sheets.

Figure 9:
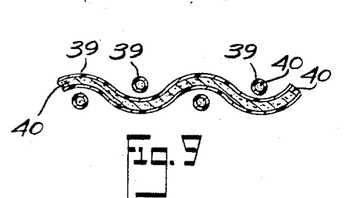
FIG. 9 is a sectional view of a mesh structure made of hollow plastic tubing filled with metal-containing fuel particles for use as reinforcing material in solid rocket propellants.
Figure 10:
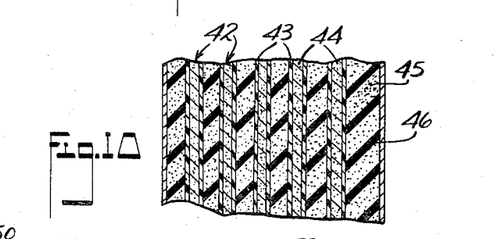
FIG. 10 is an elevational sectional view of a solid propellant charge illustrating the use of coated and encased rods of exotic metal hydride particles as reinforcers for the propellant charge.

In still another aspect of the present invention, the coated exotic fuel cores can be elongated in form and can be used as reinforcers in the propellant charges much like steel rods are used to reinforce concrete. FIG. 9 illustrates a reinforcing mesh structure made of interwoven thin-walled polyethylene tubes 39 having outside diameters of ¼ inch and filled with a core 40 of 325 mesh-exotic lithium hydride particles. FIG. 10 illustrates a plurality of reinforcing rods 42 similar to rods 20, each rod 42 comprising plastic tubing 43 and an inner core 44 of exotic metal fuel particles. The rods 42 are embedded in a conventional propellant comprising oxidizer particles 45 dispersed in a polysulfide rubber binder 46. As seen in FIG. 10, each of the rods is sealed at each end to prevent premature reaction of the fuel particles 44 with the oxidizer particles 45.

Figure 11:
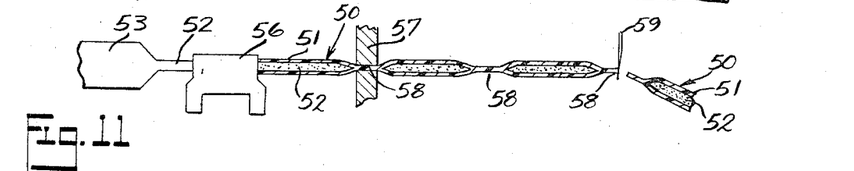
FIG. 11 is a diagrammatic view of a process of making coated wires of lithium aluminum hydride and lithium hydride particles with parts broken away and shown in section.
Figure 12:
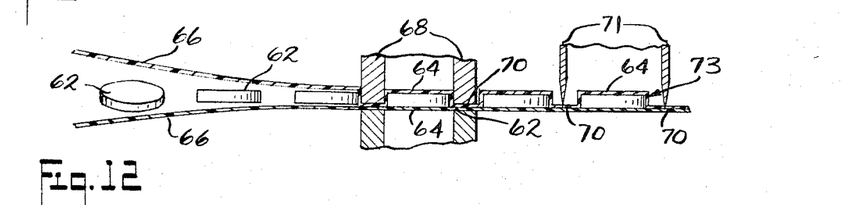
FIG. 12 is a diagrammatic view of a process of encapsulating discs of exotic metal particles within the two resin foils to provide a coated fuel slug to enable a large amount of the exotic metal to be added to a solid rocket propellant charge.

Continuing to refer to the drawings, FIGS. 11 and 12 illustrate methods of making coated fuel rods and discs.

FIG. 11 illustrates the making of a coated rod 50 comprising a plastic coating 51 of polyethylene formed around a wire 52 of a lithium-lithium aluminum hydride composition. The wire 52 is formed in a conventional wire extruder 53 in an atmosphere of nitrogen, the lithium being used in an amount of 30 percent by weight of the total and acting as a binder for the hydride particles. The extruded wire 52 having a diameter of 20 mils is coated in a wire coater 56 with a film of polyethylene about 2 mils in thickness, again the coating being accomplished in an atmosphere of nitrogen.

In the embodiment shown in FIG. 11, the coated wire 50 is crimped and fused by suitable heat sealing means 57 into lengths of ¼ inch, the metal wire 52 being squeezed away from the crimped section 58 leaving only the polyethylene at that location. The crimped and coated wire 50 is cut at each of the small-area sections 58 by cutting means such as a guillotine 59 to form a series of ¼ inch length encapsulated exotic fuel rods 50.

As previously indicated, FIG. 12 shows a method of making an encapsulated exotic metal fuel disc comprising a fuel core 62 of a disc shape having a thickness of about ⅛ inch and a diameter of about ½ inch and an outer jacket 64 formed thereon from upper and lower sheets 66 of a plastic material such as polyethylene, polytetrafluorethlyene and polyethylene terephthalate. The sheets 22 are fused and heat sealed around each of the discs 62 by a heat sealing means comprising electrodes 68 to form outer marginal edge portions 70 of the plastic material free of fuel core material around the outer periphery of the disc to form a generally hat-shaped coated fuel structure 73. After heat sealing, the marginal edge portions 70 are cut by a guillotine 71 to provide an encapsulated fuel disc.

Figure 13:
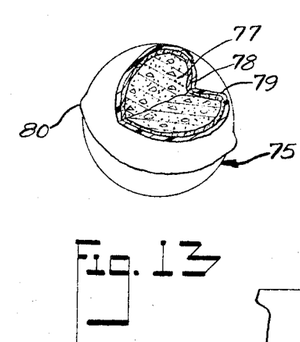
FIG. 13 is a perspective view of a coated spherical tablet of exotic metal-containing fuel particles with a portion thereof shown in section.

The embodiment of the coated fuel core shown in FIG. 13 is one that is preferred for most propellant compositions. As therein shown, a sphere 75 having an inner fuel core 77 with a thin film 78 of wax and an outer coating 79 of a suitable resin may be provided to introduce a highly reactive fuel 77 into propellant compositions. The nearly spherical form (except for the thin ridge 80 where the points of the forming dies do not meet) of the tablet 75 provides for easier dispersion and easier, more even combustion in the propellant composition. The core 77 is preferably dipped in a molten wax and thus coated with a thin film 78 of a tough wax such as paraffin and beeswax or polystyrene from a solution of the polymer in carbon tetrachloride before the resin jacket is applied.

Similarly, other fuel cores—namely, core 12 of FIG. 2, core 27 of FIG. 6 and core 34 of FIG. 8—are preferably first coated with a thin film of wax or the above described polystyrene before the outer plastic jacketing is applied to the core.

Figure 14:
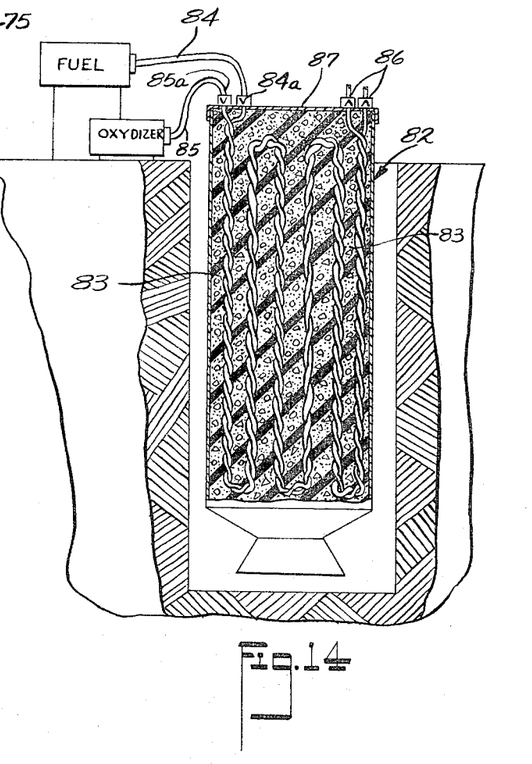
FIG. 14 is a sectional view of an end burning propellant illustrating the use of liquid fuel and oxidizers encased within plastic tubes, the liquid-filled tubes being reinforcers for the propellant; and, FIG. 15 illustrates the packaging of coated liquid or solid oxidizer and solid fuels within a light metal can, the can being an excellent method of loading large propellant boosters with high-energy delivering materials.

FIG. 14 illustrates a way of introducing and safely including high energy liquid propellants into solid propellant compositions. As seen in FIG. 14, an end burning propellant 82 is provided and comprises a conventional propellant composition 83 (40 parts by weight of aluminum powder, 45 parts by weight of ammonium nitrate and 15 parts by weight of a mixture of rubbery epoxy and polysulphide polymers). Plastic tubes 84 and 85 are provided in the form of coils within the composition 83, the tubes being preferably made of plastic and being hollow and filled with liquid oxidizer or propellant material. Tube 84 is filled with chlorine trifluoride and is wound about tube 85 (filled with hydrazine) in a braided fashion.

Each of the tubes 84 and 85 can be filled with liquid after the propellant composition 83 is cast-in-place and each upper end sealed after filling by suitable means such as valves, clips or heat sealing. In some cases, when tubes have a small internal diameter such as 1/16 inch or less, capillary action holds the liquid in the tubes. Also, when the plastic tubes are liquid-filled and used in a mesh fashion for internal burning solid propellants, the tubes are preferably pinched or of reduced diameter where the tubes cross to prevnet undesirable flow of the liquid during combustion and so maintain a constant mixture ratio.

In some cases, a tube filled with a lithium bound fuel such as $LiAlH_4$ can be wound around a tube filled with a liquid such as red fuming nitric acid rich in nitrogen tetroxide or other oxidizing material.

In this fashion, liquids such as chlorine trifluoride, dimethyl hydrazine, nitrogen tetroxide, tetranitromethane and other oxidizing and fluorinating agents can be pumped safely into cast propellant charges. A limited amount of the liquids can also be encased in a plastic jacket or plastic-lined aluminum jacket as were the fuel cores such as core 12 of FIG. 2. In this manner, some liquids can be included in the charges before casting as well as after casting or even just before launching where liquid hydrogen and/or oxygen can be pumped in.

Figure 15:
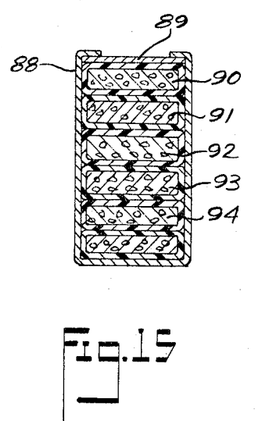

FIG. 15 illustrates the packaging of encased fuels and encased oxidizers in the form of solids or liquids—this form of packaging being a quick and safe way of preparing fuels for storage as well as for inclusion into the very large propellants—including those of one million or more pounds thrust. Light metal cans such as aluminum or beryllium cans surprisingly are not seriously damaged during mixing operation and can be handled easily in conventional sealing and filling equipment. Preferably the cans are coated on the inside with a thin film of corrosion resistant plastic such as a polytetrafluoroethylene. The outside of the can can be surface coated with an epoxy resin or other resin to protect the can if placed next to or mixed in with an oxidizing material.

Thus, in accordance with another aspect of the present invention, an aluminum can 88 having an upper sealing disk 89 is provided to house a coated oxidizer core 90 of R.D.X., a coated fuel core 91 of 85 percent by weight $LiAlH_4$ and 15 percent lithium, another coated oxidizer core 92, another coated fuel core 93 and another coated oxidizer core 94.

The above fuel and oxidizer-filled aluminum can provides a means of packaging the coated fuel core and coated liquid or solid oxidizers for use in the very large rockets.

In small rockets, the encasing of reactive fuel and oxidizer particles including small tablets is difficult—the particles being small and harder to handle than large tablets. When the very small tablets of particles are encased for use in small rockets, there is a high ratio of encasing coating to fuel or oxidizer. In large rockets, the ratio of encasing coatings or thin metal can material is small compared to the weight of the fuel and oxidizer. The thin metal cans, particularly beryllium cans, therefore, add to the total heat release as well as providing a safe method of including exotic liquids and solids in the large grains.

In the embodiment shown in FIG. 14, each of the coiled tubes is provided with an inlet valve and an outlet valve. Inlet valve 84a is provided for tube 84 while inlet valve 85a is provided for the tube 85. Exit safety valves 86 are provided for the exit ends or vent ends of the tubes 85 and 86, each exit end being open to vent while the tubes are being filled. The valves 84a, 85a, and 86 are all mounted on rocket end plate 87.

In accordance with the present invention, exotic metals such as aluminum, beryllium, etc., may be used in the fuel core, but if no hydrides or carbides are present in the main fuel ingredient, at least about 2 and preferably at least 5 percent of the fuel core should be a metal hydride or a metal carbide or even a hydrocarbon material such as naphthalene to act as a combustion conditioning agent by exposing fresh cracks and plowing up surfaces of the metals (such as aluminum which forms aluminum oxide on its surface) to promote complete combustion thereof.

A relatively low melting binder such as lithium is preferred as a binding material for the particles in the fuel core and thus, in accordance with the present invention, various amounts of metal binder and metal containing fuel particles may be used along with generally relatively small amounts of the combustion agents such as lithium hydride (high temperature decomposer 760–850° C.); or decaborane, low temperature (decomposer 100–170° C.); or oxygen and fluorine containing solids such as cellulose nitrate and polytetrafluoroethylene. In general, different amounts of fuel and metal binder are required for different sizes and types of rocket engine systems. Also, still different amounts are required for ram-jet engine systems than the rocket engine systems, and subject to altitude and speed demands in the ram-jet and also performance and application demands in the rocket. However, in most of the applications, it is highly important that at least two to three percent of the total fuel composition be a combustion conditioning agent such as a R.D.X. double base nitro powder, cellulose nitrate, for a metal hydride such as lithium hydride, decaborane, lithium aluminum hydride, aluminum hydride, and magnesium hydride to promote even and vigorous burning, it being well known, for example, that solid metal fuel slugs made only of metal particles such as aluminum form a surface coating of aluminum oxide readily thereon, which in turn, greatly decrease their activity and tend to stop the burning. This oxide formation applies to other metals as well as aluminum in a normal compacted powdery or solid composition.

The combustion conditioning agents may be added in relatively large amounts in some applications such as rocket combustion when high hydrogen yields are required to produce very desirable low molecular weights in the exhaust gases. Generally, a range of 10 to 20 percent by weight of the total fuel composition is preferred. However, in some cases, up to 50 percent by weight may be advantageous. In the case of some additions to a conventional solid propellant for a rocket engine, a light metal hydride such as lithium hydride which is rich in hydrogen may be used in amounts as high as 85 to 90 percent by weight or even up to 100 percent of the total fuel core composition, since the hydride is vaporized, decomposed and super heated to provide energy for thrust at the lowest possible molecular weight into the exhaust stream.

In accordance with the present invention, the metal binder is highly important and should be present in amounts of generally 10 to 50 percent by weight of the total fuel core, depending on energy reactivity and structural integrity demanded. However, since the lithium binder or metal alloy binder also acts as a fuel, in some cases the binder material may be increased 75 to 95% by weight of the fuel slug as in some air stream and water reaction conditions.

In any event, particularly outstanding results have been obtained when the binder material is about 15 to 40 percent by weight and the best results with the widest range of formulations are generally obtained when the binder comprises about 25 to 35 percent by weight of the total fuel composition. It is obvious that for a slug of desired structural strength, that more of a high density metal such as aluminum (density 2.7) can be incorporated than can a hydride such as decaborane (density 0.78).

The metal containing-fuel particles include metals, alloys and metalloids and solid hydrocarbons such as lithium hydride, boron carbide, naphthalene, and generally may comprise from about 25 to 85 percent by weight of the total solid fuel composition. Again, the preferred range of the metal-containing particles is about 60 to 80 percent by weight of the total weight of the fuel, the balance of the fuel being a low melting metal binder such as lithium together with, preferably, a small amount of a combustion conditioning agent, if the fuel additive does not have the desired conditioning properties.

The metal containing fuel particles which are bound up with a metal binder according to the present invention may comprise high heat releasing, exotic metal and metalloid particles such as magnesium, lithium, carbon, aluminum, boron, beryllium, or even titanium in their simple form or after hydrogen and heat treatment. Also any of their alloys which have desirable fuel characteristics and their carbides, borides and hydrides including low energy hydrides such as sodium borohydride potassium borohydride, sodium hydride and potassium hydride and including high energy hydrides of high energy metals such as decaborane, aluminum hydride, lithium hydride, magnesium hydride, beryllium hydride, lithium borohydride, lithium aluminum hydride, beryllium carbide, lithium carbide, aluminum carbide, boron carbide, silicon carbide, aluminum boride, naphthalene, polytetrafluoroethylene, etc.

Of the metal hydrides used in the examples that follow or described as suitable ingredients for the preferred metal bound fuel cores of the present invention, the best results generally are obtained with lithium hydride, lithium aluminum hydride, and decaborane. Good results are obtained from other hydrides which are listed in their order of importance, as follows: lithium borohydride, magnesium hydride, aluminum hydride, and beryllium hydride.

In general, the hydrocarbon materials including organic polymers such as fluorinated polyethylenes and monomeric hydrocarbons such as naphthalene and starch are provided to produce large volumes of gaseous products of combustion for rocket applications. Polyethylene also is a suitable polymer.

In the present description and in the claims, the term metal-containing fuel particles is intended to embrace both metal and metalloid particles. The metal-containing fuel particles generally should be finely divided, i.e., have an average particle diameter of about 5 to 150 microns and preferably about less than 5 to 50 microns. Thus, finely divided powder of the range of finest obtainable mesh to 400 mesh is preferred in most compositions to make the pressed and compacted fuel cores.

As previously indicated, the metal bound or other fuel cores of the present invention usually provide their outstanding results when they contain preferably from about 10 to 20 percent by weight of the total fuel composition of a combustion conditioning agent and/or ignition sensitizer. The ignition sensitizing agents improve ease of ignition of the fuel or propellant or renders it pyrogallic or pyrophoric and the combustion conditioning agents promote more rapid, vigorous combustion by dispersing the fuel particles into the oxidizer stream to give good mixing, rapid flame spreading and combustion and high burning rates when desired.

Thus 10% of lithium hydride in lithium will give a burning rate of about 0.1 inch per second in a suitable high temperature oxidizer stream but 10% of lithium aluminum hydride will give 0.5 to 0.7 inch per second burning rate under similar conditions, increase caused by the hydride and its effectiveness depending upon its decomposition.

Suitable sensitizer and conditioning agents for the fuel core of the fuel type are decarborane, lithium hydride, phosphorous, lithium and the carbides and hydrides of aluminum, boron, carbon, i.e., naphthalene, anthracene, polyethylene, etc. The ignition sensitizer or combustion agent component of the oxygen and fluorine containing type may be heavy plastic coated particles of R.D.X. (trinitrotrimethylenetriamine) or penta erythritol tetranitrate or any solid nitrate, chlorate, perchlorate, both inorganic and organic, or any solid nitro or perchloro compounds such as ammonium nitrate, ammonium perchlorate, hydroxylamine nitrate, hydrazine nitrate, hydrazine dinitrate, hydrazine perchlorate, trinitro toluene, picric acid, lithium nitrate, lithium chlorate, lithium perchlorate, nitro starches, nitro cellulose, nitro guanidine, urea nitrate, quaternary amineperchlorate, guanidine perchlorate, erythritol tetranitrate, double and multiple based cordite type composition, fluorine containing solids such as polytetrafluoroethylene, polymers of vinyl fluoride, vinylidene fluoride and hexafluoropropylene and all fluorine rich hydrocarbons (solid) and fluoroethers.

Some of the above listed sensitizers and combustion agents may be used as all or part of the fuels. Those which are suitable as fuels include hydrides of aluminum, boron and preferably lithium. Cellulose nitrates, containing generally 11 to 13 percent nitrate, can be incorporated in useful amounts as combined fuel-oxygen sources. Most of the other explosive based combustion promotion and flame spreading agents are too explosive and hazardous to use as fuels in other concentrations than up to 10%. But the above named low energy oxidizers i.e., chlorates and perchlorates and fuels may be used as the only combustion conditioning components of propellants which are extruded and burned as auxiliary power supply sources, as long as the extrusion rate is greater than the burning rate. Stoichiometric ratios of these oxidizers coated with plastic films can be incorporated in fast in situ burning rocket propellant.

As in the case of metal containing fuel particles, generally finely divided particles such as in the range of 100 to 400 mesh and preferably 325 to 400 mesh, provide the best results.

An excellent solid fuel core bound with a metal or metal or metal alloy, which preferably contain a combustion conditioning agent or sensitizer, may be made according to the following formulation:

TABLE II

| Ingredients | Parts by Weight | |
| --- | --- | --- |
| | General Range | Preferred Range |
| Metal binder such as lithium, magnesium or magnesium aluminum alloy | 10–90 | 20–60 |
| Fuel particles such as magnesium, aluminum, lithium hydride decaborane, etc | 5–90 | 60–80 |
| Combustion conditioning agent such as lithium hydride, lithium borohydride, sulfur, etc | 2–60 | 5–20 |

In preparing the solid fuel core composition of the present invention, it is important that certain steps be followed in order to get uniform dispersement of the fuel particles within the metal matrix. Thus, the present invention provides an efficient method of preparing a solid fuel by mixing powdered lithium and a powdered fuel such as magnesium or aluminum or these alloys with preferably some lithium hydride or other combustion conditioning agents in a vacuum or a hydrogen or inert gas atmosphere. The mixed metal, fuel, and combustion conditioning agent particles are then heated if permissible, but not essential, to a temperature below the melting point of the lithium but to a temperature at which it is flowable under reasonable pressure, and thereafter the heated mixture is conveniently pressed or extruded into shape to form a solid fuel core in which the fuel particles and the metal hydride particles are bound together by the lithium. It has been found that tumbling the metal particles such as magnesium, aluminum and lithium alloys in hydrogen gas at high temperature but below the decomposition temperature of their respective hydrides and preferably at high pressure improved their combustion properties.

In accordance with the present invention, the heated mixture may be formed by pressing under pressure say 500 pounds per square inch or more, or by extrusion into the form desired. When the mixtures are not heated, pressure up to 25,000 p.s.i., may be required for some compositions. The present invention also provides a concept of preparing a solid fuel slug by mixing the powdered fuel particle and combustion conditioning agent such as powdered boron carbide and powdered lithium hydride with a metal binder material which may be magnesium, aluminum or mangnesium-aluminum alloy or a magnesium-lithium alloy or an aluminum-lithium alloy, or a lithium-aluminum magnesium alloy and thereafter pressing the powdered mixture to form the same. Thereafter the pressed mixture is sintered to form a solid fuel core of a suitable shape such as a sphere, rod, tablet or disc at close to the fusion temperature of the binder as in the powder metallurgy practice and art, and also by using techniques as used in powder metallurgy. The metal mixture such as boron and borides, etc. may be pressed and sintered to give 5 to 30% open porous structure and vacuum impregnated with lithium hydride above 760° C. or porous sintered magnesium, aluminum, lithium alloys may be vacuum impregnated with fused lithium borohydride decarborane and other hydrides of lower melting point in the same way.

In still another aspect of the present invention the construction of the propellant or solid fuel core is of some importance. For example, one aspect of the present invention provides an improved fuel by preparing a slug with an outer core of metal hydride particles dispersed in a matrix of lithium. Disposed within such outer core is an inner core of a lightly pressed weak crumbly mixture of 60–95 parts by weight of a metal such as boron and 5–40 parts by weight of lithium hydride or other hydride or carbide.

Outstanding results can be obtained with a metal-bound lithium hydride particles were dispersed within a matrix of boron. The following composition was used to make a relatively porous hollow tablet of a boron alloy suitable subsequently as a matrix for lithium hydride particles:

| Ingredients: | Parts by wt. |
| --- | --- |
| Boron | 85 |
| Lithium hydride | 5 |

The above ingredients were mixed under vacuum and heated to 2000° C. in a furnace. The lithium hydride was decomposed and served as a blowing agent to expand the sintered boron and form an open structure foamed cylinder.

The spongy fuel tablet to be used as a fuel core was impregnated under vacuum with 20% by weight of fused lithium hydride at a temperature of 780° C.

One advantage of the tablet is that it burns slowly, the tablet thickness being selected to last the time of combustion chamber operation.

The relatively thin plastic film used to coat the core of exotic fuel particles may be any tough combustible film such as one of polyethylene, polyurethane, polymethylmethacrylate, epoxy and low polymeric polystyrene.

Suitable materials for coating the fuel cores as well as binders for the core material or binders for the whole propellant may be any plastic or rubbery binder such as organic polyurethanes, polysulphide rubber, natural rubber, butadiene-styrene copolymers, polyethylene, polytetrafluoroethylene, epoxy resins, etc. In addition to those named, also suitable as binders for the core particles such as lithium hydride are double base nitro and nitrated compositions such as cordite, or metal binders such as lithium, lithium alloys of lithium with magnesium and aluminum and alloys of aluminum with lithium and magnesium or waxy binders having a low melting point preferably below 125° F. such as petroleum jelly, paraffin wax, naphthalene, triphenyl methane, and silicone grease.

Of the above fuel core-binders, a higher energy release is provided by the metal binders, of which lithium, magnesium, and alloys of magnesium and aluminum and alloys of lithium with magnesium and aluminum are highly preferred. With these metal binders, heavy metals such as copper may be added in small amounts, say up to 2%, to improve physical properties. On the other hand, if there are any applications in which a propellant can be extruded into a burning chamber and combined therewith with oxygen and/or fluorine, a low melting waxy binder such as petroleum jelly or silicone grease is preferred for easy handling and its excellent extrudability characteristics at normal room temperature, say 20 to 30° C.

In some applications, for increased combustion rate the fuel or oxidizer binder may comprise a homogeneous mixture of nitro-cellulose and nitro-glycerine such as cordite. While the above double-base type of explosive material is preferred, triple-base binders can also be used in which a third explosive base such as dinitro-toluene, mono-nitro phenol and dinitro phenol as used in place of part of the nitro-glycerine.

The oxidizer particles for the conventional rocket propellant compositions may include percentages of well known explosive material such as R.D.X. (trinitrotrimethylene-triamine) or penta erythritol tetranitrate or any solid nitro compounds i.e. gelignite, trinitro toluene, picric acid, nitro starches, nitro cellulose, nitro guanidine, or usually any conventional solid nitrate, chlorate, perchlorate (both organic and inorganic), such as ammonium nitrate, amomnium perchlorate, hydroxylamine nitrate, hydrazine nitrate, hydrazine dinitrate, hydrazine perchlorate, lithium nitrate, lithium chlorate, lithium perchlorate, urea nitrate, quaternary amine perchlorate, guanidine perchlorate, etc.

In accordance with the present invention, the metal and/or metalloid particles incorporated in a pure fuel core preferably comprise about 35 to 95 percent by weight of the fuel layer and the balance is then preferably about 5 to 65 percent by weight of binder, whether this be organic or metallic since the fuel can be nearly pure metal powders such as commercial aluminum powder or a powder of an alloy of aluminum and lithium or a lithium-aluminum-magnesium alloy.

The oxidizer particles incorporated within the conventional oxidizer-binder propellant preferably comprises about 35 to 95 percent by weight of the oxidizer-binder weight and the balance preferably being a suitable binder therefore, suitable binders being generally the same organic binders described as suitable for suspending the metal fuel particles within the core of the coated fuel particle tablets.

With respect to the binders used for both the metal-containing fuel particles and the oxidizer particles, and particularly to the protective coating film for the tablets, some binders with built-in oxygen and fluorine provide advantage in many applications. These binders are fluorinated polyurethanes, fluorinated polyethylenes or nitro substituted polyurethanes and nitro substituted polyethylenes or polyurethanes or polyethylenes having perchloro substituents on their main chains, or other hydrocarbon polymers having hydrogen, carbon, with or without oxygen atoms, and in which some of the hydrogen atoms are replaced by nitro or fluorine groups or even perchloro groups.

In one aspect of the present invention, polyurethanes, whether they are fluoro substituted or nitro substituted or non-substituted, which are made with excess isocyanate so that they have some isocyanate end groups are particularly advantageous in binding reactive metal and metal hydride particles and the like since the NCO groups are highly reactive towards water and react with any moisture present before admixing the hydride during manufacture and absorbed during storage etc., which might otherwise deteriorate the propellant charges.

Thus, in accordance with the present invention, polyurethanes are suitable as highly adhesive binders for the fuel core or as combustible backing material for jacketing the fuel core for incorporation into a conventional oxidizer-binder solid propellant. Polyurethanes, as is well known in the art, are made by reacting polyhydric materials such as polyethers, polyesters or polyamines containing reactive hydrogen atoms with polyisocyanates (which are preferably diisocyanates although some triisocyanates may be used).

Generally, the linear rubbery polyurethanes are formed on the molar ratio of polyether or polyester to polyisocyanate of about 1 to 1. However, as previously discussed, when the diisocyanate or triisocyanate, or mixture of the two are used in amounts in excess over a 1 to 1 ratio of mole equivalent weights, the excess isocyanate groups are present in the polymer which tend to scavenge any moisture present during storage, etc to further prevent reaction of moisture with exotic metal or metalloid particles such as lithium, lithium hydride particles etc. to deteriorate the charge prematurely. Suitable polyethers are polyethylene glycol, polypropylene glycol, polytetramethylene ether glycol and fluorinated and nitro substituted derivatives of the same. Suitable polyesters are polyethylene adipate, polypropylene adipate and poly (ethylene-propylene) adipates or succinates, or polyesters such as above with —$NO_2$ groups and fluorine atoms as substituents on their polymer chains.

Suitable polyisocyanates are p,p'-diisocyanato diphenylmethane, 2,4-toluene diisocyanate, mixtures of 2,4- and 2,6-tolylene diisocyanates, naphthalene 1,5-diisocyanate, hexamethylene diisocyanate, and p,p',p''-triisocyanato triphenyl methane. As previously indicated, nitro-substituted and fluoro substituted polyurethanes are particularly advantageous because they have built-in oxygen and fluorine for combination with the metal fuel particles. Examples of said fluoro- and nitro-substituted polyisocyanates are 3,5-fluoro, 2,4-toluene diisocyanate, 3,5-nitro, 2,4-toluene diisocyanate, 3,3'-difluoro-4,4'-biphenylene diisocyanate, 3,3'-dinitro-4,4'-phenylene diisocyanate, 3,3'-difluoro-4,4'-diisocyanato diphenylmethane, 2,3,5,6-tetrafluoro para phenylene diisocyanate.

In accordance with the present invention, the thickness of the coating jacket for the fuel cores is of importance. Generally, the thickness of each of the coating jackets may be from about 1/10 mil thousandths or thinner to about 8 or even up to 10 mils to provide benefits of the present invention.

Generally, if the film is less than about 1/10 mil, breaks are likely to occur and subsequent reaction of the exotic fuel particles within the core may lead to detonation. If the film is 10 to 12 mils in thickness, generally an increased thickness leads to difficulty in dispersing and utilizing the exotic fuel particles in the core.

An excellent thin film for jacketing the exotic metal tablets, rods, discs, etc. may be provided on the tablet by depositing thereon a liquid mixture of 75 parts by weight of 200 mesh potassium perchlorate particles 2 parts by weight of $ZnO_2$, and 25 parts by weight of liquid polysulphide rubber.

The liquid polysulphide rubber, a reaction product of ethylene dichloride and sodium tetrasulphide composed of —$C_2H_4S_4$— units, is cured by the zinc oxide at relatively low temperatures to coat the exotic fuel particles of the core with a tough uniform layer. Thiokol LP-2, sold by the Thiokol Corporation, is a suitable liquid polysulphide polymer.

Another example of a material which can be used as a jacket with "built-in" fluorine is polyvinyl fluoride having a molecular weight of preferably about 100,000 to 200,000, a melting point of about 185 to 195° F. and being soluble in dimethyl formamide, butyl lactone and cyclohexanone. Copolymers of vinyl fluoride with vinylidene fluoride and hexafluoropropylene are also suitable.

Other film forming materials may be used as the inhibiting, yet combustible coating around the fuel core. For instance, excellent results are obtained when Adiprene L, a liquid linear isocyanate terminated polyurethane containing approximately 4 to 4.3% reactive polyisocyanate sold by Du Pont, is used. Generally, about 100 parts of the above polymer, which has an average molecular weight of about 2000, a viscosity of about 16,000 to 19,000 cps. at 73° C. and is prepared from about 1.2 to 1.8 moles or more of toluene diisocyanate per mole of polytetramethylene ether glycol, are used along with about 2 to 18 parts by weight of a curing agent which is preferably MOCA, a curing agent sold by Du Pont which is 4,4'-methylene bis (2-chloroaniline). Other curing agents such as glycols, including 1,4-butanediol, and polyols including trimethylol propane and glycerol may also be used and the curing may be accomplished at temperatures as high as 212° F. for 3 to 4 hours but is preferably accomplished at low temperatures, if necessary, such as 8 to 10 hours.

The following examples are intended to illustrate the present invention and not to limit it in any way:

EXAMPLE 1

The following ingredients were mixed to provide a homogenous mixture for processing into tablets:

| Ingredients: | Parts by wt. |
| --- | --- |
| Lithium aluminum hydride (325 mesh) | 10 |
| Lithium powder (400 mesh) | 30 |
| Aluminum powder, (325 mesh) | 60 |

The resultant mixture was heated to a temperature of about 300° F. at which time the lithium particles became soft and deformable enough under relatively light pressure (200 to 300 p.s.i.) to form a matrix for the lithium aluminum hydride particles and the aluminum particles. The heated mixture was fed into a pharmaceutical tablet machine which was in an atmosphere of argon and tablets of ¼ inch diameter were made from the lithium-bound fuel composition.

The tablets were then coated with a thin film of an epoxy resin by applying a liquid epoxy resin over each of the tablets and allowing the resin to harden thereon to form a hard, non-tacky and non-hygroscopic jacket around the lithium-bound fuel composition. The above coated tablets are useful in supplying high metal and metal hydride content to solid rocket propellant compositions without danger of premature reaction of the metals and metal hydrides contained therein.

EXAMPLE 2

Lithium hydride powder (325 mesh) was formed into ¼ inch tablets in a pharmaceutical tablet-making machine, the machine being housed in an atmosphere of argon so that the lithium hydride particles could be pressed together safely at a pressure of 200 p.s.i.

The lithium hydride tablets were surface coated with a thin film of an epoxy resin such as Epon 828, one of the epoxy resins having a molecular weight of about 350 to 4000 sold by the Shell Chemical Corporation. Epon 828 is believed to be a liquid condensation product of epichlorhydrin and bisphenol A having an average molecular weight of 384 and an epoxy equivalent of from about 105 to 200.

Each of the tablets was coated by dipping in a bath of the liquid Epon 828 resin. Three parts by weight of diethylene triamine were also used in the bath for each 20 parts by weight of the epoxy resin as a curing agent therefor.

The resultant coated tablets were used to add otherwise dangerous amounts of lithium hydride to a large solid propellant having a diameter of about 3 feet.

EXAMPLE 3

A sheet of fuel particles was prepared by mixing equal parts by weight of 325 mesh aluminum powder and 325 mesh lithium aluminum hydride powder and compressing the same at a pressure of 20 tons per square inch to a thickness of ⅛ inch.

Tablets, ⅛ inch in diameter, were stamped out of the sheet by using a suitable die and the tablets coated with aluminum powder by applying an aluminum paint to the surfaces of the tablet and allowing the same to dry. The paint used was a suspension of 325 mesh aluminum powder in a suitable aromatic organic solvent and containing ingredients such as found in quick drying paints to provide a thin coating of about 1 mil thickness on the tablets.

The coated tablets were added as ingredients to the following rocket propellant formula:

| Ingredients: | Parts by wt. |
| --- | --- |
| Coated tablets of Al and $LiAlH_4$ | 27 |
| Ammonium perchlorate | 57 |
| Polyurethane resin (a rubbery reaction product of about equal moles of MDI (p,p'-diisocyanato diphenyl methane) and a polyethylene adipate having a molecular weight of 2000) | 16 |
| Total | 100 |

The ingredients were mixed and charged into a receptacle to form a large diameter rocket slug, the polyurethane acting as a binder or matrix for the perchlorate particles and the coated tablets. No detonation or deterioration took place even after a storage period of three months, and, even after that length of time, the slugs exhibited good burning qualities and delivered high energy upon the completion of combustion tests. The burning rate of the above described slug remained slow and yet a higher release of energy was obtained than a slug containing a conventional oxidizer-binder composition of ammonium perchlorate and the polyurethane resin in the weight ratio of 82/18 without any fuel particles added in the form of tablets.

EXAMPLE 4

Relatively large spherical particles of lithium hydride were prepared by fusing a charge of lithium hydride in a furnace at a temperature of about 680° C. in an atmosphere of argon and dropping the resultant liquid lithium hydride from a tower in the form of small spheres like raindrops into hot oil, the tower also having an atmosphere of argon. The droplets solidified in the oil bath to form relatively large spheres of LiH having diameters of about 1/16" to ¼". The spheres were collected, drained from excess oil and coated with Epon 828 epoxy resin, the coating procedure and resin being described in detail in Example 1.

The spheres were added to test samples of solid rocket propellants in amounts of 40 percent by weight of the total rocket composition, the balance being lithium perchlorate (40 percent) and a rubbery reaction product of 1 mole of polyethylene-propylene adipate (M.W.=1800) and 1.2 moles of p,p'-diisocyanato diphenyl methane (20 percent).

Each of the test samples burned at relatively slow rates releasing a large amount of energy. In general, the smaller spheres (1/16 to ⅛ inch diameter) were more suitable for the smaller test propellant compositions and the larger diameter spheres (3/16 to ¼ inch diameter) were best suited for the larger, heavier propellants.

EXAMPLE 5

A fuel composition was thoroughly mixed in an atmosphere of nitrogen, the composition containing 80 parts by weight of 325 mesh aluminum particles, 15 parts by weight of 425 mesh lithium particles and 5 parts by weight of lithium hydride particles. The mixture was heated to a temperature of 270° F. so that the lithium, while not melting, was fluid enough to flow under pressure of 500 p.s.i. in a die to form a series of thin lithium-bound fuel discs about 1 inch in diameter and $\frac{1}{16}$ inch thick.

Each of the discs were coated with polyethylene by apparatus similar to that shown in FIG. 12 in which the fuel discs were laminated between two thin films of polyethylene having a thickness of about 5 mils, the area around the disc being heat-sealed by a suitably shaped heat sealer such as the heat sealing electrodes 57 shown in FIG. 12, and the enclosed discs freed from the polyethylene film and other discs (connected to it through the crimped sections 58) by chopping the film off by means similar to the guillotine 59.

The resultant coated discs were found to be excellent high energy delivering fuels for additives to a fuel composition for ram-jet and aquaduct rocket engines as well as additives to propellant compositions for solid airborne rockets.

EXAMPLE 6

A fuel composition comprising 20 parts by weight of lithium particles having a mesh size of 425 and 80 parts by weight of lithium aluminum hydride particles having a mesh size of 200 was fixed, heated to 275° C. and formed into a wire having a diameter of $\frac{1}{16}$" by a suitable wire extruder such as the wire extruder and other equipment shown in FIG. 11. The extruded lithium-lithium aluminum hydride wire was passed into a wire coater such as the coater shown in FIG. 11 where a thin coating of polyethylene about 2 mils in thickness was applied in an inert atmosphere. The coated wire was contacted every $\frac{1}{2}$ inch by a heat sealer and crimper which crimped the wire and its polyethylene coat, and the crimped wire cut at each of its crimped sections to form elongated wire articles. The resultant coated rods having an inner fuel slug core of lithium-bound lithium aluminum hydride particles were excellent high energy additives for propellants suitable for the large solid rockets as well as small solid rockets.

EXAMPLE 7

A number of relatively long coated fuel rods were made of lithium-bound lithium aluminum hydride particles as described in Example 6 except that the rods were cut in 5 ft. lengths instead of $\frac{1}{2}$ inch lengths. Each of the rods was heat sealed at each end as also described in Example 6. Some of the rods were placed in a 5 ft. long, 5 inch internal diameter mold, and embedded in a conventional oxidizer-binder propellant composition comprising 45 parts lithium perchlorate, 30 parts ammonium perchlorate and 25 parts of a 20/30 rubbery copolymer of butadiene and styrene, the coated rods being used as reinforcers for a propellant composition in the same fashion that steel rods are used to reinforce concrete.

The above described propellant-forming composition comprising 65 parts by weight of the oxidizer particles dispersed in 35 parts by weight of the butadiene-styrene copolymer was cast into the mold around and between the coated rods and allowed to solidify to form a rigid, yet impact resistant and even burning propellant charge.

In the above example, the binder can be replaced by a polyurethane material that is a reaction product of 100 parts by weight of a polypropylene adipate having an average molecular weight of about 2000, an OH number of 60, an acid number of 1 and a viscosity at 73° C. of 1000 cps. and 8 parts by weight of an 80/20 mixture of 2.4- and 2.6-tolylene diisocyanates. Good results are also obtained by using 100 parts by weight of Multrathane R-26, a polyester sold by the Mobay Chemical Company and 8 parts by weight of Mondur T-80, an 80/20 mixture by weight of 2,4- and 2,6-tolylene diisocyanates also sold by the Mobay Chemical Company. The above polyurethane starting ingredients are well known raw materials for potting and encapsulating applications.

EXAMPLE 8

A series of 4 ft. long-$\frac{1}{8}$ inch diameter polyethylene coated tubes were made by sucking a plurality of 200 mesh and 325 mesh lithium hydride powder particles into a polyethylene tube 4 ft. long having a wall with a 2 mil thickness, and heat sealing the ends to form a densely packed tube. A mesh structure was made by weaving the filled tubes with the centers of the tubes spaced one inch apart. Three of the one inch-mesh structures were found to make excellent reinforcers for a 5-inch diameter 4 ft. long solid rocket propellant in which the meshes were spaced apart in the propellant in the form of cylinders, each cylinder concentric about the longitudinal axis of the propellant. The propellant composition used to embed the powder-filled tubes was a mixture of 60 parts by weight of lithium perchlorate and 40 parts by weight of a polysulphide rubber which is the reaction product of ethylene dichloride and sodium tetrasulphide and 2 parts by weight of zinc oxide to cure the polysulphide rubber. Of the total propellant weight, the mesh of fuel-filled tubes was 25 percent.

As described in my copending application Ser. No. 850,387 filed Nov. 2, 1959 and entitled "Laminated Tape Propellants" the oxidizer particles also can be encased with a thin tough plastic film to minimize the danger of their premature reaction with the usually reactive and dangerous exotic metal particles such as lithium hydride.

As also pointed out in my copending application Ser. No. 862,692 filed Dec. 29, 1959 and entitled "Solid Fuels and Formulations," both oxidizers such as lithium perchlorate and fuels such as lithium hydride, or either one of them, may be encased in a plastic film $\frac{1}{2}$ to 5 or 6 mils thick to prevent their premature reaction and to allow more oxidizer and fuel particles to be packed in a given binder than ordinarily possible. As also therein discussed, the heavier plastic coatings are desirable both for safety and for providing $H_2$, $H_2O$ and $CO_2$ gases for improved rocket propulsion since the metallic fuels such as LiH usually produce solid oxides which do not contribute to the thrust.

In the examples just described, other metal-containing fuel particles previously described as suitable can be substituted in whole or part for the lithium hydride particles and other exotic fuel particles employed.

Likewise, other suitable coatings for the tablets, rods, discs, wafers and other fuel slugs shown in the examples may be substituted in whole or part for the coatings used such as aluminum powder and the epoxy and polyethylene resins. The suitable coatings have been previously described and include polyethylene, polyurethane, polystyrene and other organic resins less reactive than the fuel particles with moisture and the oxidizer materials.

As is well known in the art, conventional oxidizer-binder propellant compositions may be made by using oxidizer particles such as ammonium nitrate and the oxidizers herein described as suitable for the combustion conditioning agent and a binder such as rubbery copolymers of butadiene and another copolymerizable vinyl monomer comprising about 2 to 8 carbon atoms including styrene, alpha methyl styrene, acrylonitrile and methyl isopropenyl ketone or a polysulphide rubber. The above oxidizer-binder compositions can be substituted in whole or part for the oxidizer particles and binders employed as the conventional oxidizer particles and rubbery binder used in the examples.

It is to be understood that further modifications of the compositions, articles, and methods of the present invention may be made without departing in spirit and scope from the present invention.

What is claimed is:

1. A pharmaceutical-size tablet having a volume of about 1/1190 to 8 cu. in. comprising a reactive high energy releasing fuel core of a foamed boron matrix impregnated with lithium hydride, and an outer continuous coating jacketing said core, the coating being less reactive with oxidizing materials than the core and having a thickness of about 1/10 mil to 10 mils.

2. A fuel slug of tablet size comprising a core of foamed boron impregnated with lithium hydride and an outer continuous polyethylene coating jacketing said core.

3. A fuel slug having a volume of about 1/1190 to 8 cubic inches comprising a plurality of metal hydride fuel particles in which the metal is selected from a member of the group consisting of aluminum, magnesium, titanium, lithium, silicon, boron and beryllium and a lithium binder for said particles, said fuel slug having therearound a relatively thin continuous jacket of an organic resin having a thickness of about 1/10 mil to about 10 mils, said organic resin being less reactive with oxidizing materials than said metal hydride particles.

4. A fuel slug having a volume of about 1/1190 to 8 cubic inches comprising a fuel core containing about 70 to 90 parts by weight of metal particles in which the metal particles are selected from a member of the group consisting of aluminum, magnesium, titanium, lithium, silicon, boron and beryllium, about 5 to 15 parts by weight of a metal hydride particle in which the metal is selected from a member of the group consisting of aluminum, magnesium, titanium, lithium, silicon, boron and beryllium and about 10 to 25 parts by weight of the lithium binder for said metal particles and said metal hydride particles and a coating jacketing said fuel core of an organic resin having a thickness of about 1/10 mil to about 10 mils, the resin being less reactive with moisture and oxidizers than said core.

5. A solid fuel composition suitable for ram-jet and rocket engines comprising a fuel core containing about 70 to 90 parts by weight of aluminum particles, 5 to 15 parts by weight of lithium hydride and about 10 to 25 parts by weight of a lithium binder for said aluminum particles and said lithium hydride particles, and a coating of an organic resin jacketing said fuel core having a thickness of about 1/10 mil to 10 mils.

6. A solid fuel capable of delivering a high thrust for propulsion in torpedo, rocket and ram-jet engine systems comprising about 50 to 90 parts by weight of finely divided high energy particles of a metal-containing fuel dispersed and bound within about 10 to 50 parts by weight of a metallic matrix which also burns to provide energy for propulsion, said fuel particles being selected from a member of the group consisting of a metal, a metal hydride and a metal carbide in which the metal is selected from a member of the group consisting of aluminum, magnesium, titanium, lithium, silicon, boron and beryllium, and said metallic matrix is selected from a member of the group consisting of lithium, magnesium, aluminum, boron, a magnesium-aluminum alloy, a magnesium-lithium-alloy, a magnesium-lithium-aluminum alloy and an aluminum-lithium alloy, the metallic matrix fused around and surrounding each fuel particle to disperse the fuel particles substantially uniformly throughout the solid fuel, and a coating jacketing said solid fuel, the coating being less reactive with oxidizing materials than the fuel and having a thickness of about 1/10 mil to 10 mils.

7. A solid fuel for safe addition of exotic fuel particles to a solid rocket propellant composition comprising a fuel core having a volume of about 1/1190 to 8 cubic inches and containing 70 to 90 parts by weight of aluminum particles, 5 to 15 parts by weight of lithium hydride particles and 10 to 25 parts by weight of a lithium binder containing said particles dispersed therein, and a polytetrafluoroethylene coating for said fuel core having a thickness of about 1/10 mil to about 10 mils.

8. A propellant charge comprising an organic binder and a plurality of rods dispersed therein, each of said rods having an inner fuel core comprising about 70 to 90 parts by weight of aluminum particles, 5 to 15 parts by weight of lithium hydride particles and 10 to 25 parts by weight of a lithium binder containing said particles dispersed and encased therein, and a thin outer coating jacketing said inner core, the outer coating having a thickness of about 1/2 to 6 mils.

9. A propellant charge comprising an organic binder and a plurality of spheres dispersed therein, each of said spheres having an inner fuel core comprising about 70 to 90 parts by weight of aluminum particles, 5 to 15 parts by weight of lithium hydride particles and 10 to 25 parts by weight of the lithium binder containing said particles dispersed therein and encasing the same, and a thin outer coating jacketing said inner core, the outer coating having a thickness of about 1/2 to 6 mils.

10. A propellant charge comprising a binder, an oxidizer, and a plurality of thin walled hollow elongated organic plastic tubes interwoven in the form of a mesh from about 50 tubes per inch to one tube every 2 inches, said plastic tubes being filled with a high energy delivering fuel core and the tubes so dispersed in the binder with the oxidizer so as to reinforce the propellant charge, the core comprising about 70 to 90 parts by weight of aluminum particles, 5 to 15 parts by weight of lithium hydride particles and 10 to 25 parts by weight of a lithium binder containing said aluminum and lithium hydride particles dispersed therein and encased therearound, the thickness of the walls of said plastic tube being about 1/2 to 6 mils.

11. A method of making a solid fuel structure having a volume of about 1/1190 to 8 cubic inches for safe addition to a solid oxidizer-binder propellant charge comprising the steps of mixing finely divided metal-containing particles and a blowing agent to form a mixture, heating said mixture to form a foamed matrix of said particles, impregnating said foamed matrix with a fused metal hydride to form a fuel core, and applying an outer coating to said fuel core having a thickness of about 1/10 mil to about 10 mils and less reactive with moisture and oxidizers than said core.

12. A method of making a coated solid fuel core having a volume of about 1/1190 to 8 cubic inches for safe addition to a solid oxidizer-binder propellant charge comprising the steps of mixing finely divided lithium alloy particles and a blowing agent to form a mixture, heating said mixture to form a foamed matrix with a fused metal hydride to form a fuel core, and applying a coating to said fuel core having a thickness of about 1/10 mil to about 10 mils and less reactive with moisture and oxidizers than said core.

13. A solid fuel for safe addition of exotic fuel particle to a solid rocket propellant composition comprising a fuel core containing about 70 to 90 parts by weight of aluminum particles, 5 to 15 parts by weight of particles of a combustion conditioning agent comprising lithium hydride and 10 to 25 parts by weight of a lithium binder having said particles dispersed therein, and a polyurethane film jacketing said core of about 1/10 to 10 mils in thickness which does not react with water and oxidizers at room temperature.

14. A solid fuel for safe addition of exotic fuel particles to a solid rocket propellant composition comprising a fuel core having a volume of about 1/1190 to 8 cubic inches and containing 70 to 90 parts by weight of aluminum particles, 5 to 15 parts by weight of lithium hydride particles and 10 to 25 parts by weight of a lithium binder containing said particles dispersed therein and there being a polyethylene coating for said fuel core having a thickness of about 1/10 mil to about 10 mils, said coating being less reactive with moisture and oxidizers than said core.

15. A solid fuel composition suitable for ram-jet and rocket engines comprising a fuel core containing 70 to 90 parts by weight of aluminum particles, 5 to 15 parts by weight of sulfur particles and 10 to 25 parts by weight of a lithium binder, and a coating jacketing said fuel core having a thickness of about 1/10 mil to about 10 mils and being less reactive with moisture and oxidizers than said core.

References Cited
UNITED STATES PATENTS 3,070,469 12/1962 Jenkins _______________ 149—5
3,035,948 5/1962 Fox _______________ 149—87 X
3,006,743 10/1961 Fox et al. ___________ 149—19

BENJAMIN R. PADGETT, Primary Examiner.

LEON D. ROSDOL, CARL D. QUARFORTH,
Examiners.

REUBEN EPSTEIN, Assistant Examiner.